United States Patent [19]

Greene

[11] 3,817,341
[45] June 18, 1974

[54] HYDRAULIC DRIVE FOR TRUCKS, TRAILERS AND TRUCK-TRAILER COMBINATIONS

[76] Inventor: Clarence Kirk Greene, 100 N. Arlington Ave., Reno, Nev. 89501

[22] Filed: Oct. 17, 1972

[21] Appl. No.: 298,366

[52] U.S. Cl. ............................. 180/14 D, 180/66 R
[51] Int. Cl. ......................... B60k 17/14, B60d 1/08
[58] Field of Search............ 180/22, 23, 14 A, 14 B, 180/14 D, 14 R, 44 M, 44 F, 66; 60/494, 329

[56] References Cited
UNITED STATES PATENTS

| | | | |
|---|---|---|---|
| 1,840,866 | 1/1932 | Rayburn | 60/329 |
| 2,556,758 | 6/1951 | Haynes | 60/494 |
| 3,227,235 | 1/1966 | Budzich | 180/14 A |
| 3,292,723 | 12/1966 | Pinkerton | 180/44 F |
| 3,481,419 | 12/1969 | Kress | 180/44 M |
| 3,680,652 | 8/1972 | Greene | 180/44 F X |

FOREIGN PATENTS OR APPLICATIONS 697,541  9/1953  Great Britain.................... 180/14 A Primary Examiner—David Schonberg
Assistant Examiner—Terrance L. Siemens
Attorney, Agent, or Firm—Oswald H. Milmore

[57] ABSTRACT

A truck, coupled to one or more trailers, has a differential pump driven by the truck's power plant, the pump including an output shaft mechanically coupled to a truck driving wheel, fluid outlet and inlet ports, mechanical reacting means for driving the output shaft at a speed which varies inversely with the quantity of fluid flowing through the pump, (preferably the pump having a by-pass valve for replacing a mechanical clutch), and one or more hydraulic motors on the trailer connected by conduits through coupling means to the truck and pump. The motors may be of variable, positive displacement, controlled from the truck, so that when the displacements are zero no torque is applied to the trailer; or they may be fixed displacement and connected to valves which alter the flow route to vary the effective motor displacement. Thereby the trailer can be started on poor ground, can drive the truck engine in compression, and can maintain tension on the mechanical coupling. A truck towing several trailers is disclosed.

17 Claims, 6 Drawing Figures

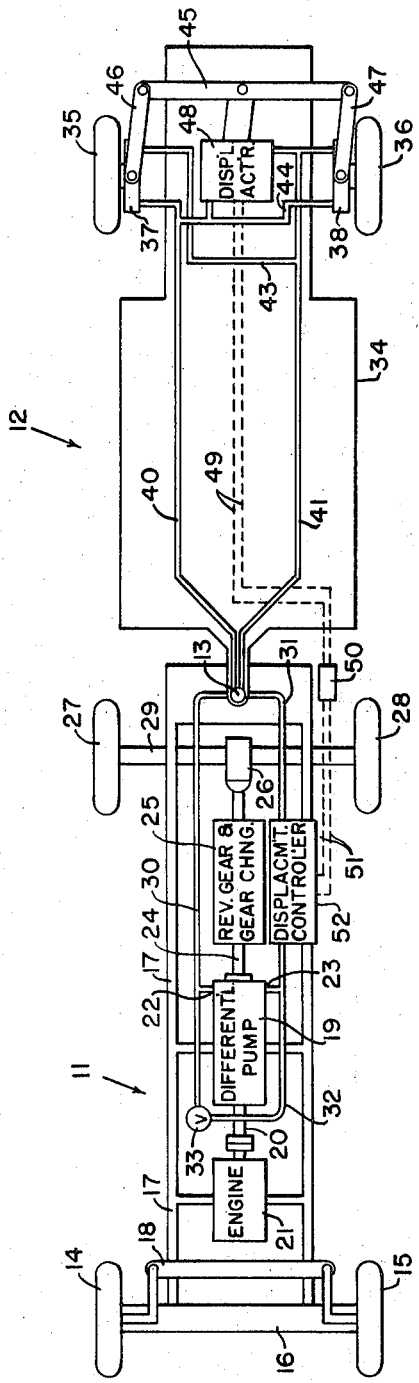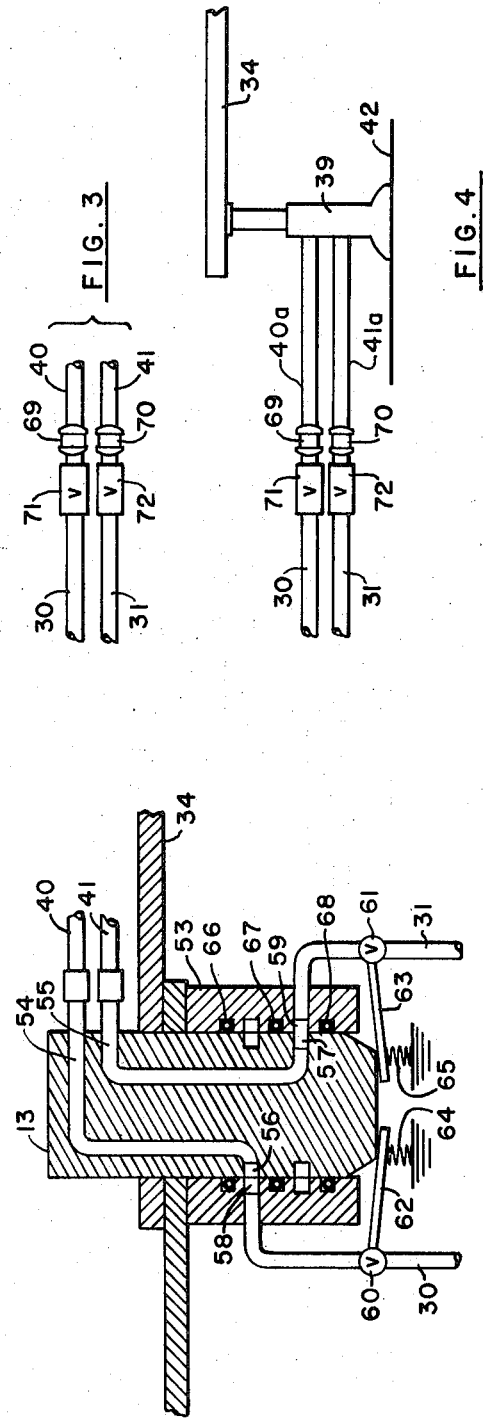

HYDRAULIC DRIVE FOR TRUCKS, TRAILERS AND TRUCK-TRAILER COMBINATIONS

GENERAL

The invention relates to trucks (also called tractors), trailers, and truck-trailer combinations having a hydraulic drive system powered by power plant on the truck for driving, at least for part of the time, the trailer wheel(s). It is especially useful in combinations which include semi-trailers, towed either directly by the truck or via a full or other trailer, which may be also driven by the drive system.

In one aspect, the invention is suitable for such truck-trailer combiantions which are operated on rough or unfirm terrain, possibly later on firm terrain, wherein power need be applied to the trailer wheels only in the former circumstance. Moreover, the invention permits power to be applied from the trailer wheels(s) to the truck, thereby applying power to the truck engine upon deceleration or downgrade, for working the power plant as a brake.

THE PROBLEM

It is often difficult or impossible to obtain enough traction (either while accelerating or decelerating) on the wheels of a towing truck when the supporting ground is wet, loose or unfirm. This is a special problem with trucks pulling trailers with heavy loads, such as earth movers or "carryalls." Often, they are semi-trailers (resting at their front ends on the truck or a preceding trailer). Prior attempts to apply a driving torque to the trailer wheels have in practice been unsuccessful, usually leading to costly and inflexible installations and/or were difficult in operation, as when it is desired to disconnect the power connection to the trailer wheels, as when travelling on level or surfaced roads, and usually preventing useful distribution of power from the power plant to the truck and trailer.

Another difficulty with known systems was encountered when moving the truck-trailer combination rearwards and, on firm roads, when decelerating or descending a grade; there is then a tendency to jack-knifing, especially when the line of action on the truck makes an angle to the trailer sufficient to pass laterally outside of the trailer wheels. This tendency is especially severe with semi-trailers, and could be obviated by insuring tension between the truck and trailer.

Other problems were encountered with hydraulic drive systems that drive some wheels mechanically and others hydraulically:

1. It was not feasible, using economical or simple devices, to supply always a desired fraction of the power from the truck plant to the hydraulic motor(s), and to maintain this fraction upon changes in power output from the plant. Thus, when a pump which supplies fulid to hydraulic motors driving some vehicle wheels is mechanically driven by the power plant which additionally drives other wheels mechanically, the torques applied to the two sets of wheels are often unfavorable or variable; sometimes the rotation speeds are unequal, and any adjustment of speeds is caused by mechanical or hydraulic slippage, which results in a waste of power.

2. Attempts to take fluid from a variable transmission unit also causes a variable torque to the hydraulically and mechanically driven wheels. For example, it was proposed by Swift, in U.S. Pat. No. 3,354,977, Nov. 28, 1967, to drive the front wheels of a tractor by hydraulic motors which received fluid from a "hydromechanical transmission unit" driven by the power plant, and to drive the rear tractor wheels mechanically from the power output shaft of the transmission unit. The unit was said to be that shown in the U.S. Pat. No. 3,151,456, Oct. 6, 1964, which included a variable-displacement pump driven by the power plant, the pump having axially reciprocable pistons moving within pumping chambers in a block rotated by the power plant and bearing against a variable-inclination swash plate, a hydraulic motor driven by fluid supplied by the pump and having axially reciprocable pistons bearing against a second swash plate of variable inclination, both swash plates rotating with and driving the output shaft. Apart from being very complicated and costly to build and service, such a system, since it uses a variable-speed and variable-torque transmission unit, is not suitable for the present invention, and is subject to the difficulties noted above in 1). The pressures within the pumping chambers can, at certain inclinations of the swash plates, be higher than permitted by the materials used. Further, movable swash plates cannot be readily balanced dynamically for different speeds and inclinations: it would be desirable to use a unit having a fixed displacement pump wherein, when a swash plate is used, the fixed plate can be dynamically balanced, as by weights.

Moreover, in the hydromechanical transmission unit of Swift no hydraulic power is generated when the swash plates are normal to the axis of the shafts, and auxiliary pumps are required to make the unit operate, as for changing the inclinations of the swash plates.

OBJECTS

An object of the invention is to provide a towing truck adapted to tow one or more trailers which has means for supplying hydraulic power to the trailer(s), the power plant being arranged to drive one or more ground-engaging driving wheels on the truck, e.g., through an output shaft from the pump which supplies the hydraulic power which is applied to the hydraulic motor(s) on the trailer(s).

Ancillary to the foregoing, objects, attained in certain embodiments, are: (1) to provide a truck wherein the hydraulic power supplied to the trailer(s) can be held to a more or less constant fraction of the power output of the power plant, despite changes in said output, and (2) to provide a hydraulic drive system wherein the pump has a fixed displacement, making it unnecessary to change the inclination of a swash plate (or, as in the case of a vane pump, to eliminate the use of swash plates).

An alternative object is to provide a hydraulic drive system for trucks which are adapted to tow one or more trailers wherein the power from the plant is applied to a differential pump (as defined hereinafter), having a pump output shaft which is mechanically coupled to at least some truck wheel(s) and having the same torque as the pump input shaft, the fluid ports of the pump being connected to coupling means which are connectible either to one or more trailers for powering hydraulic motors mechanically coupled to the trailer wheel(s) or to other auxiliary equipment, such as a jack.

A further object is to provide a hydraulic drive system wherein power to both the truck and to the trailer wheel(s) is applied only during selected periods, as when the combination is accelerating, moving on unfirm ground, or decelerating.

A further object is to provide a hydraulic drive system whereby the power plant can be de-clutched from the truck and trailer wheels by a valve, obviating the need for a mechanical clutch.

Ancillary to the two foregoing objects, it is desired to provide a drive system which permits power from the driving or ground-engaging wheels of the trailer(s) to be supplied to the truck's power plant for decelerating the combination, thereby reducing the energy otherwise absorbed by the brakes. The power plant, if an internal combustion or similar engine, is thereby made to act in "compression" and the trailer(s) is (are) retarded to reduce or avoid the forward push of the trailer, thereby reducing the tendency toward jack-knifing.

Another object is to provide a drive system for truck-trailer combinations wherein: (1) tension can be maintained at all times that the hydraulic drive to the trailer is operative, whether decelerating or moving in reverse; and/or (2) the torque applied to the trailer wheel(s) can, when desired, be made to have a more or less constant ratio to the torque applied to the truck wheel(s), regardless of the power output of the truck power plant.

Related to the two foregoing objects, it is sought to apply torque to the trailer wheel(s) in a manner than substantially no power is lost due to hydraulic or mechanical slippage, as to balance the speeds of rotation of the trailer and truck wheels.

Another object, attained in some embodiments, is to arrange the hydraulic drive system to permit power to be applied to the trailer wheel(s) at the control of the truck operator, so that the powered driving of the trailer wheel(s) can be made effective or not, e.g., depending upon whether the combination is accelerating, decelerating, or moving at a constant speed, or whether it is operated on loose or wet ground or on a firm or hard-surfaced road.

Still another object is to provide a hydraulic drive system which is capable of applying rearward traction to the trailer wheel(s) in addition to the truck wheel(s), to facilitate backing. This object, achieved only in certain embodiments, permits backing of the combination although the line of action of the truck extends rearwardly laterally beyond the trailer wheels.

Additional objects, attained in some embodiments, are to provide valves which facilitate coupling and uncoupling of the trailer(s) from the truck while preventing the loss of any great quantity of hydraulic fluid although the truck pump is operated; and to provide means for varying the proportion of power from the power plant which is applied to the trailer(s).

Additional objects will become apparent from the following detailed description.

SUMMARY

The truck includes a power plant which is coupled drivingly to one or more truck wheels and to a pump having a fluid outlet and inlet, which are connected via hydraulic coupling means and conduits or are connectible through such coupling means, to hydraulic motor means mounted on one or more trailers, or to other hydraulic equipment.

As applied to the truck or tractor, which constitutes a subcombination of the invention, the truck's power plant is coupled to the truck driving wheel(s) through the output shaft of a differential pump, which as a pump input shaft mechanically coupled to the power plant. Such a differential pump has a pump input shaft coupled to the power plant, an output shaft which is mechanically coupled to drive one or more wheels of the truck, a fluid inlet, a fluid outlet, and internal reacting means for driving the output shaft at a speed which varies inversely with the rate flow of fluid through the input and outlet, the two latter being connected to the coupling means for connection to the trailer(s).

The differential pump may be of any suitable construction, having preferably pumping chambers of fixed displcement, such as radially or axially movable piston-and-cylinder combinations, e.g., as shown in my U.S.A. Pat. No. 3,680,652, Aug. 1, 1972, or the spaces between radially movable vanes, as shown in my U.S. Pat. No. 3,702,642. The differential pump is also known as a "clutch pump," since the outlet and inlet, when interconnected by a by-pass conduit having therein a valve, effectively de-clutches the power plant by permitting, when the valve is opened, flow of hydraulic fluid against negligible pressure drop; this causes no torque to be applied to the pump output shaft and no hydraulic pressure difference to be applied to the hydraulic motor(s). When this valve is closed both torques are applied, that of the pump output shaft being (in most constructions) equal to the torque of the input shaft, regardless of the rate of hindered flow of the fluid through the hydraulic motor(s) on the trailer(s), assuming the absence of any speed-change mechanism within the pump other than the reacting means stated.

Because such a differential pump can have a fixed displacement, the difficulties previously noted regarding variable displacements are obviated.

Moreover, since the speed of the pump output shaft depends upon the rate of flow of hydraulic fluid through the pump, the speed of the mechanically driven truck wheel(s) will always adjust itself to the speed of the trailer wheels, and no loss of power due to any discrepancy in speeds is necessary to to slippage. In other words, the power is always fully distributed between the truck wheel(s) and the trailer wheel(s). It may be noted that the differential pump is not a variable transmission unit since the torque on the pump output shaft is always the same as the torque on the pump input shaft, and the only reduction in speed is caused by flow of fluid through the hydraulic motors.

GENERAL DESCRIPTION

Since a differential pump has the characteristic of being able to receive hydraulic power from the fluid whenever the fluid pressure at the pump inlet exceeds that at the pump outlet, for example, when the trailer motor(s) act(s) as a pump, it is possible to cause the truck's power plant to act as a brake. Thus, when decelerating or moving down-grade, the fluid makes the pump input shaft turn more rapidly than before; similarly, work from the truck wheels is transmitted via the pump output shaft to the power plant.

Moreover, since in most embodiments of the differential pump it can be operated either in its forward or reverse directions, causing thereby a reversal in the direction of flow of the hydraulic fluid, the hydraulic motors can be driven in the reverse directions. Of course, whether the pump is driven in reverse depends upon the location of the reversing gear, assuming a power plant which is uni-directional. Reverse operation of the pump is usually feasible only if a reversing gear is placed between the power plant and the pump. However, uni-directional operation of the pump may be used in this invention; the motor displacement must then be changeable between positive and negative values.

The hydraulic motor(s) on the trailer(s) is (are) preferably of the positive displacement type, and the motor(s) may be arranged to permit varying of the displacement either by altering the actual displacement or the effective displacement. In the former case, as suggested in said U.S. Pat. No. 3,680,652, a hydraulic, electrical or a mechanical system, controlled from the truck cab, may be used. In the latter, two or more hydraulic motors are used (which may have fixed displacements, but may be variable) which are connected by conduits to valve means mounted on or controllable from the truck cab which alter the flow of fluid through the motors, including flow through the motors in parallel and series; such a valve is shown in my said U.S. Pat. No 3,702,642. As is further shown in the said patent, several hydraulic motors may be provided at each driving — in this case on the trailer-wheel, to permit the valve to have more positions and achieve a greater variation in the effective displacement.

When the differential pump is reversible, the displacement of the trailer motor(s) needs to be altered only between zero and a positive value. But when the pump is not reversible, the actual or effective displacement of the motor(s) must be variable to both sides of zero, if reverse operation of the trailer wheel(s) under power is desired. When the motor(s) is (are) at zero displacement, the trailer(s) is (are) in free wheeling, and no hydraulic fluid flows therethrough.

Various types of valves can be provided on the truck or in the hydraulic coupling means for preventing loss of fluid when the trailer is uncoupled and the pump is (accidentally) operated. This valve may take the form of a "hydraulic fuse" known per se in the hydraulic art, connected in at least the coupler connected to the pump outlet (and, preferably, in both couplers), which closes an internal or associated valve when the flow rate exceeds a predetermined rate, and/or when the pressure at the free end of the fuse is below a predetermined level, and/or when an abutment on a mating coupler element is absent. Such an abutment can open the valve upon re-coupling. The valve means can also be associated with the mechanical coupler or hitch for the trailer; this may include a king pin having passages for fluids and in registry with peripheral passages in a socket, leading to valves in series with the latter and mechanically opened by the weight of the coupled trailer.

The coupling units for hydraulic lines, in some embodiments, also effect connections between other lines or conduits, such as a drain line from the motor(s), a supercharging line, and hydraulic, electrical or mechanical lines for operating the displacement actuators for varying the motor displacement. The drain line draws off leakage from the motor(s), feeding it through a small auxiliary pump on the truck to the reservoir. The supercharging line, occasionally required, is pressured by another small auxiliary pump taking suction from the reservoir for maintaining the pump and/or the motors at operating pressures, it being noted that in hydraulic mcahinery, especially those having swash plates-operated pistons which have no tensile connection to the plate, require fluid pressure to maintain the piston rods in contact with the plate. Supercharging lines are typically maintained at 10 to 18 kg. per sq. cm. Since such lines are well known in the art, they are not further described herein.

The other usual connections between the truck and the trailer(s), as for operating the trailer brakes, tail and stop lights, elevators, dumping equipment, etc., are provided as usual, in addition to the connections to be described.

It may be noted that in some hydraulic motors the condition of zero displacement can be achieved by control of the hydraulic pressures, apart from mechanically altering the size of the motor expansion chamber. Thus, when the pressure at the motor inlet is sufficiently reduced, as by restriction of flow, and fluid at a high pressure is supplied to the motor case, the pistons remain away from their outer positions, e.g., away from the swash plate or cam, whereby the motor is given a zero displacement. This system of reducing the displacement of hydraulic motors is known in Sweden, using radially movable pistons, an is not, therefore, further described herein, although it may be used in the invention.

According to an alternative embodiment, wherein the trailer motor(s) rotates in only one direction, an overriding clutch is provided between the hydraulic motor(s) and the trailer wheel(s), to drive the latter only forwardly. But this arrangement, illustrated in the aforesaid U.S. Pat. No. 3,702,642 is usually not preferred because it prevents the rearward movement of the trailer unless an additional disconnecting clutch is used for reverse movements.

When several trailers are connected to a truck, as, for example, a full trailer coupled directly to the truck and towing a semi-trailer, the hydraulic motor(s) is (are) applied at least to the last trailer or, optionally, to both trailers. The motors to the several trailers are then preferably connected in parallel, whereby the torques applied to the trailers are in a fixed, such as in equal, relations, depending upon the displacements and the gear ratios to the wheels.

DRAWINGS

The invention is illustrated by the following specific examples, shown in the accompanying drawings, wherein:

FIG. 1 is a schematic plan of a truck-trailer combination according to a first embodiment;

FIG. 2 is an enlarged sectional view, taken on a vertical plane through the central axis of the coupler or trailer hitch;

FIG. 3 is a detail plan of an alternate system of coupling the conduits, using hydraulic fuses;

FIG. 4 is a fragmentary elevation of an auxiliary device, exemplified as a jack, connected to the truck's couplers;

FIRST EMBODIMENT

Figure 5:
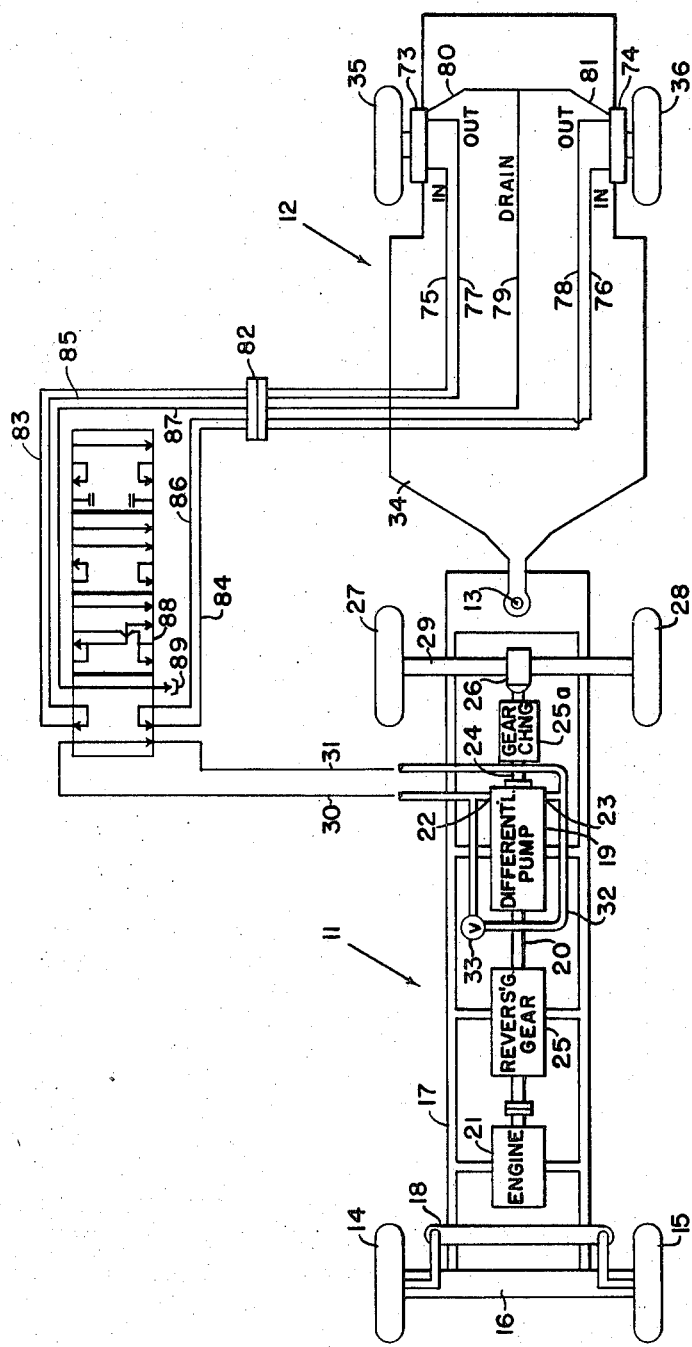
FIG. 5 is a schematic plan of another embodiment, wherein a multi-position valve is used for varying the trailer motor displacement, making possible the use of fixed-displacement motors.

In FIG. 1, the truck 11 is mechanically coupled to semitrailer 12 by a trailer hitch which includes a vertical pin 13, the trailer resting on the rear of the truck. The truck includes steerable front wheels 14, 15 joined by an axle beam 16 which is fastened by springs (not shown) to a truck chassis 17, steering mechanism being represented at 18. The truck carries a differential pump 19 which has a pump input shaft 20, mechanically coupled to the truck power plant, such as an internal combustion engine 21. The differential pump is of any suitable construction, e.g., as was previously described with reference to earlier U.S. patents, and has a high-pressure outlet 22, an inlet 23, a pump outlet shaft 24, and internal reacting means which drive the output shaft at a speed which varies, in relation to that of the input shaft, inversely with the rate at which fluid flows through the inlet and outlet. A fluid reservoir, auxiliary pumps for returning drain fluid and for pressurizing a supercharging line, although occasionally present, are not shown since they are used only occasionally and are well known in the hydraulic art. The output shaft 24 is mechanically coupled, through a gear-shift box 25, which normally includes one or more reversing gears, to a differential gear system 26, which drives the rear truck wheels 27 and 28 by axles (not shown) situated within a transverse housing 29.

The pump outlet 22 is connected by a conduit 30 and the pump inlet 23 by a conduit 31 to coupling means. These coupling means may be mounted on the trailer, and may include the mechanical coupling pin 13. To obviate the need for a mechanical clutch, there may be a by-pass conduit 32 having a normally closed valve 33, controllable by the truck operator. When this valve is opened, fluid flows against negligble opposition from the pump outlet to its inlet, resulting in zero or almost zero torque in the pump output shaft 23 and low pressure in the conduit 31, whereby no torque is applied to the trailer motor(s) to be described; the power plant is effectively declutched when the valve 33 is open.

The rear end of the semi-trailer, which includes a chassis 34, has a pair of wheels 35, 36, each mechanically coupled to drive a separate, variable-displacement hydraulic motor 37 or 38. The motors are preferably of the positive displacement type. Although an example of such a motor is shown in the aforesaid U.S.A. patent No. 3,680,652, motors of other constructions can be used. The trailer carries conduits 40 and 41, having branch conduits 43 and 44, which connect the two hydraulic motors in parallel. The motor displacements are variable between positive and negative values, including zero, e.g., by a bar 45 having pivotal connections to lever arms 46 and 47 on the motors, the bar being movable by a remotely controlled displacement actuator 48. The actuator may include mechanical, electrical or hydraulic power elements, and since such devices are well known there is no further description. For example, the actuator may include a self-synchronous motor, also called a "selsyn," optionally having a powered follow-up device (taking power, if hydraulic, from the conduits 40 and 41) for moving the bar 45. Regardless of type, the actuator is connected by a line 49 (which may contain one or more conduits, e.g., three wires in the case of a selsyn motor) which is connected by a disconnectible coupling 50, e.g., carried on the truck, and thence via a line 51 to a displacement controller 52 on the truck. The truck operator can, by use of the controller 52, vary the displacements of the trailer motors 37 and 38.

VARIOUS COUPLING ARRANGEMENTS

FIG. 2 shows one possible hydraulic coupling arrangement, only the high-pressure conduit from the pump and the fluid return lines being shown, it being understood that additional conduits, such as those providing a drain and/or a supercharging line, when either is used, may be provided. The vertical king pin 13, fast on the trailer chassis 34, extends through a hole in the truck chassis into a socket 53 which is fast on the truck, and contains passages 54 and 55 which are connected to the conduits 40 and 41, respectively, and communicate with annular grooves 56 and 57, which are constantly in registry with annular grooves 58 and 59 in the socket. The latter grooves communicate through valves 60 and 61 with the conduits 30 and 31, respectively, the valves having operating levers 62 and 63 which open the valves when their ends are depressed by the king pin, as shown, but are closed when raised by expansion springs 64 and 65. Locking means for securing the king pin to the socket (not shwon) are provided. Suitable sealing means, such as O-rings 66, 67 and 68, are provided.

According to an alternative coupling arrangement, shown in FIG. 3, the conduits 30 and 31 are connected to disconnectible couplers 69 and 70 through hydraulic fuses 71 and 72, which contain or are associated with valves. The couplers 69 and 70 are according to any well-known or suitable fixture design. As is known in the art, such hydraulic fuses close the contained or associated valves to prevent loss of hydraulic fluid when the fixtures 69 and 70 are uncoupled, being responsive either to hydraulic flow, pressure, and/or to mechanical means.

The conduits 30 and 31 may be connected to other auxiliary hydraulically-powered equipment. For example, as is shown in FIG. 4, the fixtures can be coupled to conduits 40a and 41a which communicate with a hydraulically powered jack 39, resting on the ground 42 and bearing upwards against the trailer chassis 34.

SECOND EMBODIMENT

FIG. 5 illustrates an embodiment in which the reversing gear is placed between the power plant and the pump input shaft, permitting reverse operation of the pump although the power plant is uni-directional; it also shows, separately applicable to the invention, motors, preferably of fixed displacements, can have their effective displacements altered by valve means on or controllable by the truck operator. The reference numbers 11 – 36 denote parts previously described, with the exception that the reversing gear 25 is placed between the plant 21 and the pump input shaft 20. Again, these motors are advantageously of positive displacements. It is in most instances preferable, to avoid unduly loading the pump 19, to place the gear-changing mechanism 25a, for altering the speed and torque, between the pump output shaft 24 and the differential gear unit 26, since this mechanism usually involves a reduction in speed (and an increase in torque). To this end, a separate gear-change box 25a is provided.

Because the pump is in this embodiment reversible, the conduit 30 is at low pressure and the conduit 31 is at high pressure when the truck and trailer(s) is (are) moved rearwards and the hydraulic motor(s) on the trailer(s) are driven in reverse. The king pin 13 is, in this embodiment, of conventional, trailer-hitch construction, and is not used to couple the hydraulic conduits.

Each of the trailer wheels 35, 36, has a hydraulic motor 73 or 74 drivingly connected thereto, and connected by the conduits 75 and 76 to receive high-pressure fluid, and to discharge low-pressure fluid through the conduits 77 and 78. A drain duct 79 may be provided, for collecting leakage fluid at a low pressure from the motors, this duct having branch ducts 80 and 81. These four (or five or more) conduits extend along the trailer and beyond it to a multi-passage coupling unit 82, partly on the trailer and partly on the truck.

The conduits 30 and 31, as well as the five conduits 83-87, which are on the truck and communicate via the coupling unit 82 with the conduits 75-79, respectively, are connected to a four-position valve 88, which is mounted on the truck and is connected to a receiver 89 for drained fluid, representing the intake to the pump (not shown) which moves drained fluid into the reservoir. When the valve 88 is in its first position, as shown, no torque is applied either to the truck or trailer wheels, since fluid in the conduits 30 and 31 is able to flow against substantially no opposition. When the valve, which is controllable by the truck operator, is shifted to its second position (that is, to cause the connections of the second rectangle move toward the left), the two motors 73 and 74 are connected in parallel, to receive fluid from and to discharge fluid to the pump, whereby both are driven by the pump and they have a large maximum effective displacement. In the third position of the valve, these motors are connected in series and have a combined lower effective displacement. Finally, in the fourth position of the valve flow through the conduits 30 and 31 is wholly blocked, and there is no application of power to the motors; hence all power from the power plant is transmitted to the output shaft 24 and to the truck wheels, the said shaft rotating at the same speed as the pump input shaft 20.

It may be noted that in the fourth valve position the output of each trailer motor is connected to its input, so that the motors are free wheeling. In the third valve position, connecting the motors in series, the motors rotate at equal speeds, which may be in some cases undesirable, as on turns on firm ground; this can be overcome by providing overrunning clutches, or at least one such clutch on one trailer wheel, as disclosed in the aforesaid U.S. Pat. No. 3,702,642, which also described in more detail the valve and suggests other valve arrangements, including the use of four motors, all of which may be used in the present invention.

THIRD EMBODIMENT

Figure 6:
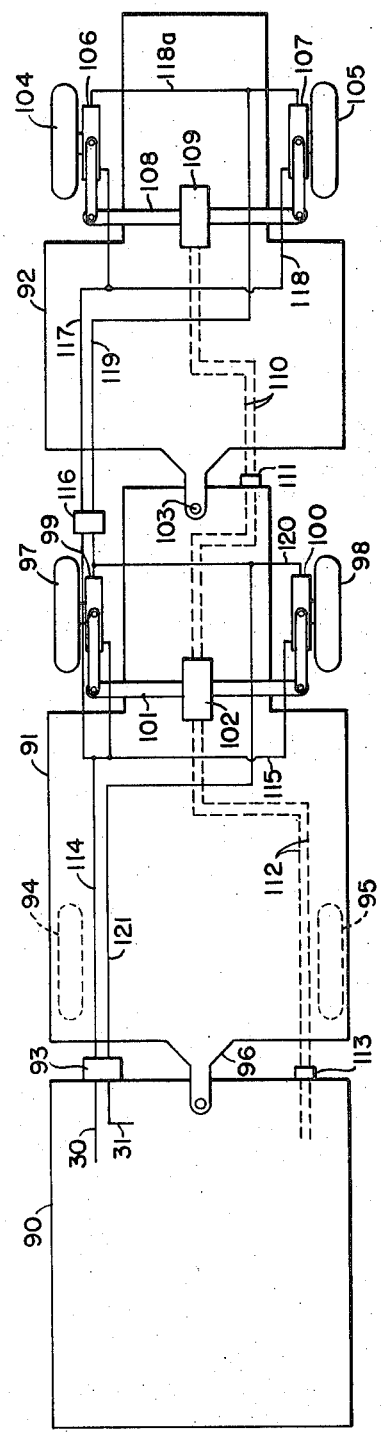
FIG. 6 is a schematic plan of still another embodiment wherein the truck tows a full trailer and a semi-trailer, using the hydraulic system of FIG. 1 for driving both trailers.

The invention may also be applied to combinations of a truck and several trailers, as shown in FIG. 6, wherein a truck 90 (constructed as described for FIG. 1, and having a high-pressure conduit 30 and a return conduit 31) is mechanically coupled to a full trailer 91 which, in turn, mechanically coupled to a second trailer 92, which may be a semi-trailer. The hydraulic conduits are coupled through unit 93, which may include hydraulic valves or fuses as shown in FIG. 3.

The trailer 91 has steerable front wheels 94, 95, controlled by a drawbar 96, and rear wheels 97, 98, which are mechanically coupled to variable displacement motors 99 and 100 which are interconnected by a displacement control bar 101, actuated by a remotely controlled actuator 102, the parts 97-102 being as described for the parts 35-38, 45 and 48 for FIG. 1. Similarly, the trailer 92 has its front end resting on the rear of the full trailer 91 and coupled thereto by a vertical pin 103; it has, toward its rear, wheels 104, 105, which are mechanically coupled to variable displacement hydraulic motors 106 and 107, respectively, the motors being interconnected by a displacement control bar 108 which is actuated by a remotely controlled actuator 109, as on the full trailer 91.

The actuators 102 annd 109 may be interconnected by a line 110 on the semi-trailer, a coupler 111, a second line 112 on the full trailer, and a coupler 113 on the truck, for actuation by the controller 52 of FIG. 1. Thereby the displacement of all four motors can be varied. Alternatively, separate control lines from the actuators 102 and 109 may extend to the controller 52.

The four hydraulic motors are connected to operate in parallel. Thus, high-pressure conduits 114 and 115 supply the motors 99 and 100, and are connected via a coupling unit 116 to high-pressure conduits 117 and 118 to supply the motors 106 and 107. Fluid is returned from the motors on the last trailer through conduits 118a and 119 and, via the coupler, together with the return fluid from the motors 99 and 100, through return lines 120 and 121 to the truck via the coupler 93.

OPERATION

The truck or tractor unit is that part of the combination which carries the power plant or prime mover, together with the associated drive train to its wheel or wheels ("wheel" being used herein to include any type of ground-engaging member); the trailer is the load-carrying vehicle which is pivotally connected to the truck or to another trailer towed by the truck.

In all embodiments, the by-pass valve 33 acts as a clutch, and when open no torque is applied to any wheel; hence the power plant 21 can be started when this valve is open.

In the first embodiment, to start a forward movement from a standstill, especially on unfirm ground, the motors 37 and 38 are set to a high displacement by the controller 52, and the gear box 25 is operated to apply a low, forward gear, such as later causes the truck wheels 27 and 28 to rotate slowly at a high torque. The valve 33 is then closed gradually to apply a high forward torque both to the driven wheels of the trailer and truck. The shaft 24 turns less rapidly than the shaft 20 because fluid flows from and into the differential pump through the conduits 30 and 31, but the torques in these shafts are equal. The power applied to the trailer wheels bears a substantially constant ratio to that applied to the truck wheels, regardless of the speed and power output of the power output shaft of the plant 21.

After the combination gains speed, the controller 52 is operated to reduce the displacement of the trailer motors, thereby reducing the torque applied to the trailer wheels; further, the gear box 25 is operated to increase the truck speed in relation to the speed of the shaft 24, i.e., changed to a higher gear, thereby also reducing the torque on the truck wheels, the valve 33 being preferably momentarily opened during the latter operation. While both operations alter the said ratio, the power distribution remains uniform for any settings of the displacement and gear ratio.

When operating on hard, substantially level roads, the displacement of the motors is reduced to zero, placing the trailer into free wheeling and preventing flow of fluid to and from the pump, so that the shafts 20 and 24 turn at the same speed.

The displacements of the motors may again be made positive when decelerating or moving down-grade, causing the motors to act as pumps; fluid flow is in the same direction as before, driving the input shaft 20, whereby the power plant 21 acts as a brake. The power plant additionally retards the shaft 24 and the truck wheels.

For moving the combination in reverse, the controller 52 is operated to give the motors a negative displacement, the gear box 25 being also operated to drive the truck wheels in reverse. Rearward power is thereby applied to all driven wheels.

By applying rearward traction on the trailer, as when decelerating or when moving in reverse, the coupling pin 13 is maintained in tension; thereby the tendency toward jack-knifing is greatly reduced.

The second embodiment is operated as was described for the first, with the following differences:

1. The displacements of the trailer motors 73 and 74 are not physically changed, but their effective displacements are changed by operation of the valve 88 (instead of the controller 52).

2. Since a reversing gear is placed between the power plant and the differential pump, the latter is reversible, and the trailer motors are driven in reverse whenever the pump is reversed.

The third embodiment is operated as was described for the first, with the difference that both the rear wheels 97 and 98 of the first trailer and the wheels 104 and 105 of the second trailer are driven, both forwardly and in reverse, whenever the differential pump is operated and the motor displacements are not zero.

The auxiliary hydraulic device of FIG. 4, exemplified as a jack, is operated by setting the hand or other brake on the truck, operating the differential pump and closing the valve 33. Since the pump output shaft 24 cannot rotate, all power from the power plant 21 is hydraulically transmitted through the conduits 40a and 41a to the jack 39.

I claim as my invention:

1. The combination of a truck and a trailer which is mechanically and pivotally coupled to the truck, said trailer and truck each having at least one driving wheel, wherein said combination includes:
   a. a power plant,
   b. a differential pump having an input shaft coupled to be driven by the power plant, a high-pressure outlet for fluid, an inlet for fluid, an output shaft, and reacting means for driving said output shaft at a speed which varies, in relation to the speed of said input shaft, inversely with the quantity of fluid flowing through said inlet and outlet,
   c. mechanical means drivingly connecting said output shaft to said truck driving wheel, and
   d. a hydraulic motor on the trailer coupled mechanically to drive said trailer driving wheel, and conduit means on the truck and trailer for connecting the inlet and outlet of said motor respectively to the said outlet and inlet of the pump.

2. The combination according to claim 1 wherein said motor has a positive displacement.

3. The combination according to claim 1 wherein said motor has a variable effective displacement.

4. The combination according to claim 3 which includes:
   a. remotely controlled actuator means on the trailer for varying the displacement of said motor,
   b. control means on the truck for operating said remotely controlled actuator means, and
   c. a line interconnecting said control means and remotely controlled actuator means.

5. The combination according to claim 4 wherein said motor has a positive displacement.

6. The combination according to claim 1 wherein
   a. said trailer includes at least two hydraulic motors each connected drivingly to a separate one of said trailer driving wheels, and
   b. the combination includes valve means interconnected between the pump and said hydraulic motors for causing the flow of fluid to be either
      1. through said motors in series, or
      2. through said motors in parallel,
      for varying the effective displacement of the motor combination.

7. The combination according to claim 6 wherein
   a. said motors have positive, fixed displacements, and
   b. said valve means are mounted on the truck and are controllable by the operator of the truck.

8. The combination according to claim 1 wherein said trailer is one of two trailers coupled in tandem to the truck.

9. The combination according to claim 8 wherein both of said trailers have at least one trailer driving wheel, each trailer has a hydraulic motor coupled mechanically to drive the respective trailer wheel, and both trailers have conduit means for connecting the motor inlets and outlets of the motors to said pump outlet and inlet, respectively, through said hydraulic coupling means.

10. The combination of a truck and one or more trailers which are mechanically and pivotally coupled thereto,
    a. said truck having
       1. at least one truck driving wheel,
       2. a power plant, differential pump having an input shaft coupled to the power plant, a high-pressure outlet for fluid, an inlet for fluid, an output shaft, and reacting means for driving said output shaft at a speed which varies, in relation to the speed of said input shaft, inversely with the quantity of fluid flowing through said inlet and outlet, and
       3. mechanical means drivingly connecting said output shaft to the truck driving wheel,
    b. one or more hydraulic motors on at least one trailer, said one trailer having at least one trailer driving wheel mechanically and drivenly connected to the motor, and
    c. means including conduits interconnecting said motor and said outlet and inlet of the pump and operable by the operator of the combination for varying the direction and magnitude of the torque to the trailer driving wheel applied through the said motor by the interaction of said hydraulic motor and said differential pump.

11. The combination according to claim 10 wherein said trailer is a semi-trailer having the front end thereof supported on a preceding vehicle by coupling means which permit relative motion between the trailer and the said vehicle in a substantially horizontal plane, said driving wheel and motor being situated on said semi-trailer.

12. A trailer adapted to be towed by a self-propelled truck having differential pump which includes an input shaft driven by a power plant, an output shaft mechanically coupled to at least one truck driving wheel, a high-pressure fluid outlet, a fluid inlet, and reacting means for driving said output shaft at a speed which varies, in relation to the speed of the input shaft, inversely with the quantity of fluid flowing through said outlet and inlet, and said trailer having at least one ground-engaging driving wheel, a hydraulic motor drivingly connected to said last-mentioned wheel, and conduit means adapted to be connected to said inlet and outlet of the differential pump on the truck for flowing hydraulic fluid through said motor to apply driving power to the trailer wheel from the truck.

13. The trailer according to claim 12 wherein the trailer is a semi-trailer.

14. The trailer according to claim 12 wherein said motor is a positive and variable displacement motor, and has remotely controllable actuator means mounted on the trailer and operable independently of the pressure of fluid supplied to the motor by said conduit means for varying the dispalcement of the motor, and a control line connectible to the truck for controlling the operation of said actuator means, thereby to control the displacement of the motor.

15. The trailer according to claim 12 wherein said trailer has at least two positive displacement motors drivingly connected to one or more ground-engaging trailer driving wheels, and additional conduit means from said motors adapted to be connected to the truck and including the first-mentioned conduit means for causing flow through the motors to be either in series or in parallel, to vary the effective displacement of the motors.

16. The trailer according to claim 12 which is coupled to a preceding trailer adapted for connection to a truck, in combination with said preceding trailer, both of said trailers having ground-engaging driving wheels and both trailers having each at least one hydraulic motor drivingly coupled to the respective driving wheels, said conduit means being connected to both of said motors to apply driving power to both trailers.

17. The combination of a vehicle and at least one trailer, including driving wheels on both the vehicle and the trailer, said trailer being mechanically and pivotally coupled to said vehicle, one or more hydraulic motors on the trailer coupled to drive said trailer driving wheel, and a power plant said combination having in its power train from the power plant to the driving wheels a differential pump which has an output shaft coupled mechanically to said driving wheels of the vehicle and which generates in its hydraulic fluid system a pressure which is always proportional to the input torque transmitted by the differential pump output shaft to the driving wheels of the vehicle including conduit means interconnecting said pump to the hydraulic motor on the trailer, to aid in the propulsion and/or the control of the trailer.

* * * * *